United States Patent
Choi et al.

(10) Patent No.: US 7,170,222 B2
(45) Date of Patent: *Jan. 30, 2007

(54) GREEN PHOSPHOR FOR PLASMA DISPLAY PANEL

(75) Inventors: Seo-Young Choi, Suwon-si (KR); Seung-Uk Kwon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 93 days.

This patent is subject to a terminal disclaimer.

(21) Appl. No.: 10/997,467

(22) Filed: Nov. 23, 2004

(65) Prior Publication Data

US 2005/0127811 A1 Jun. 16, 2005

(30) Foreign Application Priority Data

Nov. 24, 2003 (KR) ............... 10-2003-0083599

(51) Int. Cl.
H01J 1/62 (2006.01)
H01J 17/49 (2006.01)
C09K 11/02 (2006.01)

(52) U.S. Cl. .................... 313/486; 252/301.4 R; 313/582

(58) Field of Classification Search ......... 252/301.4 R; 313/484, 485, 486, 582, 583, 584, 585, 586, 313/587

See application file for complete search history.

(56) References Cited

U.S. PATENT DOCUMENTS 6,998,779 B1* 2/2006 Choi ..................... 313/582

FOREIGN PATENT DOCUMENTS

| JP | 2003-7215 | 1/2003 |
| KR | 2000-0060401 | 10/2000 |
| KR | 2001-0062387 | 7/2001 |
| KR | 2003-0052407 | 6/2003 |

OTHER PUBLICATIONS

Korean Patent Abstracts, Publication No. 1020030052407; Publication Date Jun. 27, 2003; in the name of Choi.
Patent Abstracts of Japan, Publication No. 2003-007215, Published on Jan. 10, 2003, in the name of Kawamura.
Korean Patent Abstract, Publication No. 20010062387 A, Published on Jul. 7, 2001, in the name of Haruki, et al.
Korean Patent Abstract, Publication No. 000060401 A, Published on Oct. 16, 2000, in the name of Kim, et al.

* cited by examiner

Primary Examiner—Mariceli Santiago
Assistant Examiner—Anne M Hines
(74) Attorney, Agent, or Firm—Christie, Parker & Hale LLP

(57) ABSTRACT

A green phosphor for a plasma display panel, comprising a first phosphor comprising $ReBO_3:Tb$ (where Re is at least one rare earth element selected from the group consisting of Sc, Y, La, Ce, and Gd) and a second phosphor of $MgAl_xO_y:Mn$ (where x is in the range of 1 to 20 and y is in the range of 1 to 30). The green phosphor improves color purity, lifespan characteristics, and discharge stability of a plasma display panel.

16 Claims, 1 Drawing Sheet

GREEN PHOSPHOR FOR PLASMA DISPLAY PANEL

CROSS REFERENCE TO RELATED APPLICATION

This application claims the benefit of and priority to Korean patent application No. 10-2003-0083599 filed in the Korean Intellectual Property Office on Nov. 24, 2003, the entire disclosure of which is incorporated herein by reference.

FIELD OF THE INVENTION

The present invention relates to a green phosphor for a plasma display panel, and more particularly to a green phosphor for a plasma display panel having improved color purity, lifespan, and discharge stability.

BACKGROUND OF THE INVENTION

A plasma display panel (PDP) is a flat display device using a plasma phenomenon to display an image in the plasma display panel. The plasma phenomenon is also called a gas-discharge phenomenon since a discharge is generated in the panel when a potential greater than a certain level is applied to two electrodes separated from each other under a gas atmosphere in a non-vacuum state.

Currently used plasma display panels generally use an alternating current (AC) driven plasma display panel similar to that shown in FIG. 1. The AC plasma display device has a fundamental structure in which a front substrate 1 is disposed facing a rear substrate 3, with a discharge space 5 between the two substrates. On the front substrate 1, a plurality of pairs of sustain electrodes are formed in a pattern, each comprising a scan electrode X, and a common electrode Y. Each of the scan electrode X and common electrode Y comprises a transparent electrode 7 and a metal film 9. A dielectric layer 11 is also coated over the front substrate and sustain electrodes for the AC driving. The surface of the dielectric layer 11 is coated with an MgO passivation layer 13. On the rear substrate 3, a plurality of address electrodes A are provided and are covered by a dielectric layer 15, and a plurality of barrier ribs 17 with corresponding red, green and blue phosphor layers 19R, 19G, and 19B formed between adjacent barrier ribs.

The front substrate is disposed facing the rear substrate and the two are sealed to one another. The internal space thereof is evacuated to reach a near vacuum state, and the discharge gas is injected therein. The discharge gas may include any one or a mixture of inert gasses such as He, Ne, or Xe. Such a PDP includes an array of groups of three electrodes with corresponding red, green and blue phosphor layers, 19R, 19G and 19B. When a predetermined voltage is applied across the two electrodes to induce plasma discharge, the fluorescent layer is excited by UV rays generated by the plasma discharge, and visible light is emitted.

Typically, the phosphor used for the PDP is a phosphor that is excited by ultraviolet rays. Because green has the highest fraction of white brightness among red, green and blue, the green brightness is the most important for improving the PDP brightness. Currently, $Zn_2SiO_4$:Mn, $BaAl_{12}O_{19}$:Mn, or $(Ba,Sr,Mg)O \cdot \alpha Al_2O_3$:Mn (where $\alpha$ is an integer from 1 to 23) are used for the green phosphor, and of these, $Zn_2SiO_4$:Mn is the most popular due to its better brightness characteristics. However, it also has shortcomings in that the discharge characteristics tend to degenerate as is discussed in further detail below.

As shown in FIG. 1, since the MgO layer 13 of the front substrate 1 and the phosphor layers 19R, 19G, 19B of the rear substrate 3 are directly exposed to the discharge space, the secondary electron emission coefficient of the MgO layer and the surface charge of the phosphor layer are directly affected by the amount of wall charge piled up on the phosphor layer and the MgO layer. During positive surface electrification, discharge failure is rarely generated, while during the negative surface electrification, discharge failure is common. This tendency is largely dependant on the driving system. In order to increase discharge stability and to decrease discharge failure, the red, green, and blue phosphors are generally selected so that the surface electrification characteristic is positive regardless of color. Nevertheless, $Zn_2SiO_4$:Mn, the most popular green phosphor, has a negative surface electrification characteristic. Accordingly, when the PDP is driven in a driving waveform sensitive to the surface electrification characteristics of the phosphor layer, that is, the variation of the rear substrate, the discharge voltage of the green cell is higher than those of the red cell and the blue cell.

The mechanism to increase the discharge voltage may be described as follows: upon the reset discharge, the characteristic of driving an alternating current plasma display during the real discharge, that is, before the discharge voltage is applied to the address electrode terminal, the wall charge is piled up. Before the discharge voltage is applied to the address electrode terminal, wall charges having opposite polarities are respectively piled up on the front substrate and the rear substrate. Thereby, a voltage differential is generated between the front and rear substrates.

When the voltage differentiation reaches a certain level, a voltage having the same polarity as the wall charge piled up on both the address electrode terminal and the scan electrode terminal is applied to discharge. Thereby, the address discharge voltage is lowered by effectively piling the wall charge at an appropriate level. Before the discharge voltage is applied to the address electrode terminal, the cations pile up on the surface of the phosphor layer of the rear substrate as a wall charge. As the $Zn_2SiO_4$:Mn having negative surface electrification characteristics is counterbalanced by the wall charge of cations, the green cell generates a smaller discharge voltage that those of the red cell and blue cell. Accordingly, the green cell of $Zn_2SiO_4$:Mn may require a higher address voltage compared to the red cell or the blue cell, and sometimes, discharge failure occurs.

In order to solve the problems relating to $Zn_2SiO_4$:Mn, Korean Patent Laid-Open Publication No. 2001-62387 discloses a green phosphor in which $YBO_3$:Tb is added to $Zn_2SiO_4$:Mn. However, the obtained green phosphor has deteriorated color purity. Further, Korean Patent Laid-Open Publication No. 2000-60401 discloses a green phosphor in which a positive charged material of zinc oxide and magnesium oxide is added to $Zn_2SiO_4$:Mn. However, the green phosphor obtained from this method also causes problems in that the color purity and the lifespan are deteriorated. Further, Japanese Patent Laid-Open Publication No. 2003-7215 discloses that a mixture of manganese-activated aluminate green phosphor and terbium-activated phosphate or terbium-activated borate green phosphor can improve the driving voltage and the brightness failure. However, the afterglow properties of green phosphor cannot be improved sufficiently and there are limits for improvement of UV collusion resistance and lifespan characteristics by the above methods.

SUMMARY OF THE INVENTION

In one embodiment of the present invention, a green phosphor for a plasma display panel having good color purity, lifespan characteristics, and discharge stability is provided.

Another embodiment of the present invention provides a combination of two green phosphors for a plasma display panel wherein the first green phosphor comprises a first phosphor of $ReBO_3$:Tb where Re is one or more rare earth elements, preferably selected from the group consisting of Sc, Y, La, Ce, and Gd; and the second green phosphor comprises $MgAl_xO_y$:Mn where x is from 1 to 20, and y is from 1 to 30.

According to yet another embodiment of the present invention, a combination of three green phosphors for a plasma display panel are provided. The first phosphor comprises $ReBO_3$:Tb where Re is one or more rare earth elements, preferably selected from the group consisting of Sc, Y, La, Ce, and Gd. The second phosphor comprises $MgAl_xO_y$:Mn where x is from 1 to 20 and y is from 1 to 30. The third phosphor is selected from the group consisting of $Zn_2SiO_4$:Mn, (Ba, Sr, Mg)O.$\alpha Al_2O_3$:Mn where $\alpha$ is an integer from 1 to 23, and mixtures thereof.

In yet another embodiment of the present invention a plasma display panel is provided which comprises a phosphor layer with red, green, and blue phosphor patterns, wherein the green phosphor pattern comprises any one of the phosphors or combinations of phosphors set forth above.

BRIEF DESCRIPTION OF THE DRAWINGS

The accompanying drawing, which is incorporated in and constitutes a part of the specification, illustrates an embodiment of the invention, and, together with the description, serves to explain the principles of the invention.

DETAILED DESCRIPTION

Figure 1:
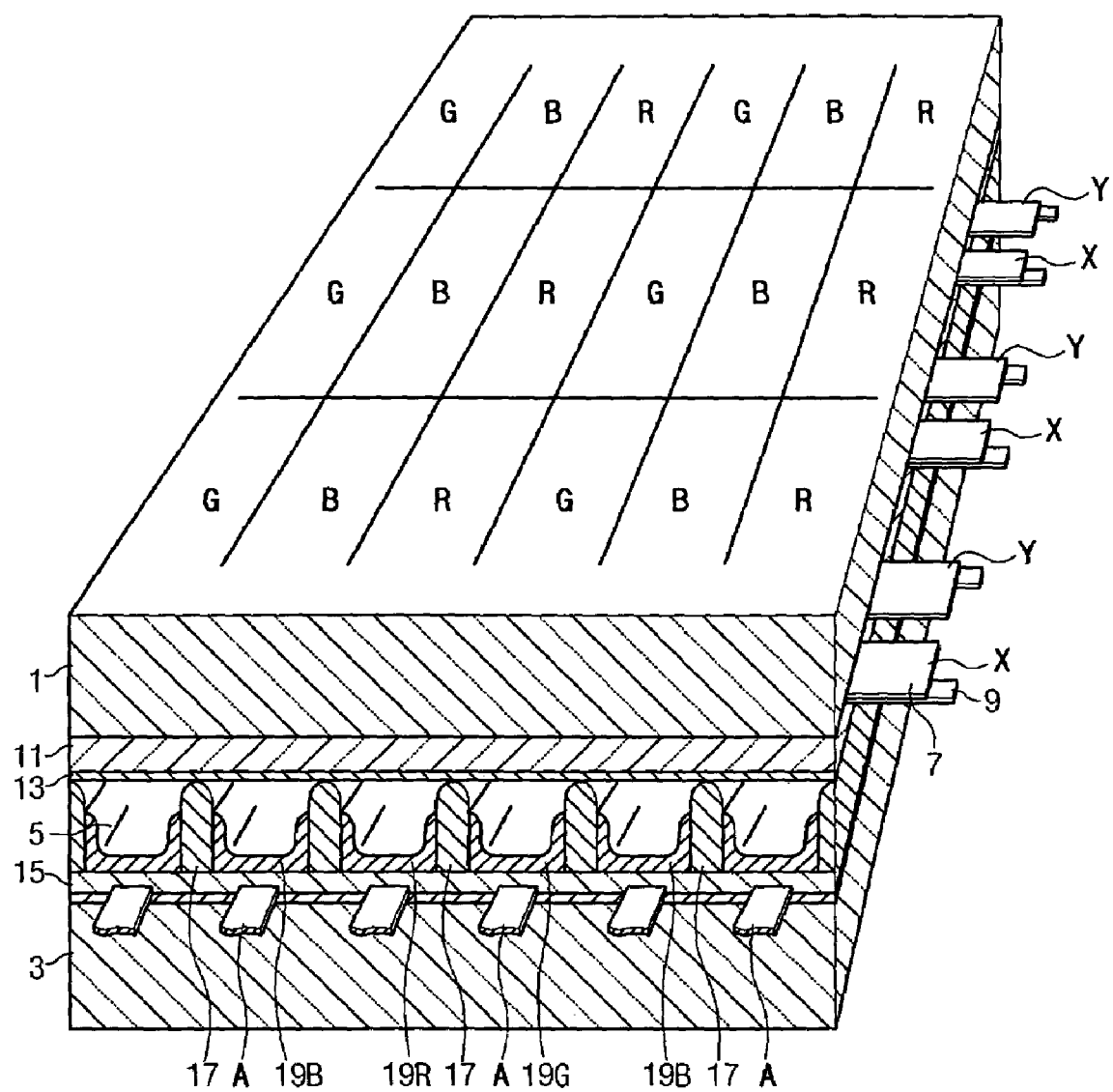
FIG. 1 is a perspective view in section showing the internal structure of the plasma display panel according to the present invention.

A green phosphor of $Zn_2SiO_4$:Mn has deficiencies as set forth above, and green phosphors of (Ba, Sr, Mg)O.$\alpha Al_2O_3$:Mn (where $\alpha$ is an integer from 1 to 23) are very fragile to vacuum ultraviolet rays (VUV), and thus their lifespan properties are poor. In the present invention, instead of the above phosphors, a mixture of $MgAl_xO_y$:Mn (where x is from 1 to 20 and y is from of 1 to 30) which has high resistance at high energy, and $ReBO_3$:Tb (where Re is a rare earth element selected from the group consisting of Sc, Y, La, Ce, Gd and combinations thereof) which has good brightness, is provided as a green phosphor. The phosphor of the present invention has good lifespan and brightness properties.

According to one preferred embodiment of the present invention, the green phosphor for a plasma display panel comprises a first phosphor of $ReBO_3$:Tb (where Re is a rare earth element selected from the group consisting of Sc, Y, La, Ce, Gd and combinations thereof) and a second phosphor of $MgAl_xO_y$:Mn (where x is from 1 to 20 and y is from 1 to 30). The first phosphor is preferably present in an amount from 30 to 80 wt %, and more preferably in an amount from 40 to 60 wt %. The second phosphor is preferably present in an amount from 20 to 70 wt %, and more preferably from 30 to 50 wt %. When the amount of the first phosphor is less than 30 wt %, the brightness deteriorates, and when the amount is more than 80 wt %, the color purity characteristics decrease. When the amount of the second phosphor is more than 70 wt %, the lifespan characteristics deteriorate, and when the amount of the first phosphor is less than 20 wt %, there is little improvement in discharge stability.

Specific examples of the first phosphor include $YBO_3$:Tb, (Y,Gd)$BO_3$:Tb, (Y,Gd,La)$BO_{O3}$:Tb, etc., and specific examples of the second phosphor include $MgAl_2O_4$:Mn, etc.

According to the another preferred embodiment of the present invention, the green phosphor further comprises $Zn_2SiO_4$:Mn along with $ReBO_3$:Tb and $MgAl_xO_y$:Mn. That is to say, the green phosphor comprising a first phosphor of $ReBO_3$:Tb (where Re is a rare earth element selected from the group consisting of Sc, Y, La, Ce, Gd and combinations thereof); a second phosphor of $MgAl_xO_y$:Mn (where x is from 1 to 20 and y is from 1 to 30); and a third phosphor selected from the group consisting of $Zn_2SiO_4$:Mn, (Ba, Sr, Mg)O.$\alpha Al_2O_3$:Mn (where $\alpha$ is an integer from 1 to 23), and mixtures thereof.

The first phosphor is preferably present in an amount from 30 to 80 wt %, and more preferably from 40 to 60 wt %. The second phosphor is preferably present in an amount from 10 to 60 wt %, and more preferably from 10 to 30 wt %. The third phosphor is preferably present in an amount from 10 to 40 wt %, and more preferably from 10 to 30 wt %. When the amount of the first phosphor is less than 30 wt %, the brightness deteriorates, and when the amount is more than 80 wt %, the color purity characteristics decrease. The specific examples of first and second phosphors are as mentioned above.

As the first and third phosphors, phosphors prepared according to well-known methods can be used. The second phosphor, $MgAl_xO_y$:Mn is prepared as follows: to a mixture of magnesium oxide, aluminum oxide, manganese oxide as an activator, and manganese salt, flux is added, and the resulting mixture is heat treated. An example of a magnesium oxide is MgO, an example of an aluminum oxide is $Al_2O_3$, an example of a manganese oxide is $MnO_2$, and examples of manganese salts are $MnCO_3$, $MnCl_2$, etc. Examples of flux include $MgF_2$, $AlF_3$, etc. However, the preparation of the second phosphor is not limited to the above method.

A plasma display is manufactured by forming a green phosphor layer in a discharge cell using green phosphors of the present invention.

The green phosphors of the present invention are dispersed in a vehicle in which a binder resin is dissolved in a solvent to provide a phosphor paste composition.

Examples of binders include cellulose resins, acrylic resins, and mixtures thereof. Examples of cellulose resins include methyl cellulose, ethyl cellulose, propyl cellulose, hydroxymethyl cellulose, hydroxyethyl cellulose, hydroxypropyl cellulose, hydroxyethyl propyl cellulose, and mixtures thereof. Examples of acrylic resins include polymethyl methacrylate; polyisopropyl methacrylate; polyisobutyl methacrylate; copolymers of acrylic monomers, such as methyl methacrylate, ethyl methacrylate, propyl methacrylate, butyl methacrylate, hexyl methacrylate, 2-ethylhexyl methacrylate, benzyl methacrylate, dimethylaminoethyl methacrylate, hydroxyethyl methacrylate, hydroxypropyl methacrylate, hydroxybutyl methacrylate, phenoxy-2-hydroxypropyl methacrylate, glycidyl methacrylate, methyl acrylate, ethyl acrylate, propyl acrylate, butyl acrylate, hexyl acrylate, 2-ethylhexyl acrylate, benzyl acrylate, dimethylaminoethyl acrylate, hydroxyethyl acrylate, hydroxypropyl acrylate, hydroxybutyl acrylate, phenoxy-2-hydroxypropyl acrylate, glycidyl acrylate, and the like; and mixtures thereof. The phosphor paste composition according to the present invention may further include a small amount of inorganic binder. The amount of the binder may be in the range of about 2 to 8% by weight based on the total weight of the phosphor paste composition.

Examples of the solvent for the phosphor paste composition include alcohols, ethers, esters, and mixtures thereof. Preferred examples of the solvent include butyl cellosolve (BC), butyl carbitol acetate (BCA), terpineol, and mixtures thereof. If too much or too little solvent is used, the fluidity of the phosphor paste composition is not suitable for coating. In consideration of this effect, about 25–75% by weight of solvent is provided.

The phosphor paste composition according to the present invention may further include an additive for improved fluidity and processing properties. Various kinds of additives include, for example, a photosensitizer such as benzophenone, a dispersing agent, a silicon-based antifoaming agent, a rheology modifier, a plasticizer, an antioxidant, and the like, and such additives may be used individually or in combination. Commercially available additives well known to those skilled in the art may be used for these purposes.

Any method of manufacturing a phosphor layer and other elements of PDPs and their structure thereof that are widely known may be applied to a PDP according to the present invention. Therefore, detailed descriptions of a method of manufacturing a PDP according to the present invention and its structure are not provided here.

The resulting phosphor paste is coated on the surface to provide a phosphor layer. The surface to be coated is a dielectric layer 15 on the surface of the back substrate 3 and the side walls of barrier ribs 17, as shown in FIG. 1. The coating method of the phosphor paste may include, but is not limited to, screen printing or spraying the phosphor paste from a nozzle. The coated paste layer is then sintered at a temperature sufficient to decompose or burn the binder resin, to thereby provide a phosphor layer.

The following examples illustrate the present invention in further detail. However, it is understood that the present invention is not limited by these examples.

EXAMPLES AND COMPARATIVE EXAMPLES

Each green phosphor was mixed in a mixing ratio as shown in Table 1, and was dispersed in a vehicle in which ethyl cellulose was dissolved in butyl carbitol acetate to obtain a phosphor paste. The phosphor paste was screen-printed between barrier ribs shown in FIG. 1, and sintered at 500° C. to provide PDPs having the phosphor layer.

TABLE 1

|  | Amount $ReBO_3$:Tb | Amount $MgAl_2O_4$:Mn | Amount $Zn_2SiO_4$:Mn | Amount (Ba, Sr, Mg)O:$Al_2O_3$:Mn |
|---|---|---|---|---|
| Comp. Example 1.1 | — | — | 100 | — |
| Example 1 | 70 | 30 | — | — |
| Example 2 | 50 | 40 | — | 10 |
| Example 3 | 50 | 10 | 40 | — |
| Example 4 | 30 | 70 | — | — |

After only the green phosphor pattern of each of the PDPs was excited, the color coordinates, according to the CIE calorimetric system, of green light emitted from the PDPs, the relative brightness of the green light using a colorimeter (CA-100), and brightness maintenance ratio (lifespan) and discharge variation were measured. The results are shown in Table 2. In Table 2, the relative brightness is a relative value based on 100 percent of Comparative Example 1.

TABLE 2

|  | Color coordinate x | Color coordinate y | Relative brightness (%) | Lifespan (after 200 hours) | Discharge variation |
|---|---|---|---|---|---|
| Comparative Example 1 | 0.254 | 0.709 | 100 | 95% | Va = 70 V (more than or equal to 500) Va = 60 V (more than or equal to 500) |
| Example 1 | 0.285 | 0.644 | 112 | 100% | Va = 70 V (194.1) Va = 60 V (258.0) |
| Example 2 | 0.260 | 0.686 | 99 | 98% | Va = 70 V (227.6) Va = 60 V (261.1) |
| Example 3 | 0.279 | 0.668 | 102 | 97% | Va = 70 V (269.1) Va = 60 V (311.4) |
| Example 4 | 0.247 | 0.702 | 98 | 97% | Va = 70 V (202.5) Va = 60 V (249.8) |

As shown in Table 2, the color purity of Example 1 is a little lower than that of Comparative Example 1. However, the brightness and lifespan characteristics (brightness maintenance ratio) of Example 1 are significantly improved over those of Comparative Example 1. In Examples 2 to 4, brightness and lifespan are also improved.

In Table 2, Va denotes the address voltage and discharge variation is calculated in order to evaluate discharge stability according to the following equation:

$$N_t/N_o = \exp(-(t-t_f)/t_s)$$

where $N_t$ denotes a number of times in which discharge fails to occur (i.e., discharge error) during the period of time t; $N_o$ denotes a number of times of counting the delay of discharge; $t_f$ denotes a delay in formation; and $t_s$ denotes a discharge variation.

As shown in Table 2, the discharge variations of Examples 1 to 4 are significantly reduced at address voltages of 70V and 60V compared to that of Comparative Example 1. The discharge stability was evaluated based on the number of discharge errors Nt and discharge variations $t_s$. As $t_s$, i.e. a parameter representing the discharge variation, becomes larger, the discharge error also increases resulting in a deterioration of display quality. Therefore, Examples 1 to 4 show improvement over Comparative Example 1 in terms of discharge stability.

As mentioned above, the green phosphor is prepared by mixing $ReBO_3$:Tb with good brightness and $MgAl_xO_y$:Mn (where x is from 1 to 20 and y is from 1 to 30) with good resistance with respect to high energy in a optimal mixing ratio, and can thereby improve a plasma display panel in terms of color purity, lifespan, and discharge stability.

What is claimed is:

1. A green phosphor for a plasma display panel, comprising:
   a first phosphor comprising $ReBO_3$:Tb where Re is a rare earth element selected from the group consisting of Sc, Y, La, Ce, Gd and combinations thereof; and
   a second phosphor comprising $MgAl_xO_y$:Mn where x is from 1 to 20 and y is from 1 to 30.

2. The green phosphor according to claim 1, wherein the first phosphor is present in an amount from 30 to 80 wt %, and the second phosphor is present in an amount from 20 to 70 wt %.

3. The green phosphor according to claim 1, wherein the second phosphor is $MgAl_2O_4$:Mn.

4. The green phosphor according to claim 1 further comprising a third phosphor selected from the group consisting of $Zn_2SiO_4$:Mn, (Ba, Sr, Mg)O.$\alpha Al_2O_3$:Mn where $\alpha$ is an integer from 1 to 23, and mixtures thereof.

5. The green phosphor according to claim 4 wherein the first phosphor is present in an amount from 30 to 80 wt %, the second phosphor is present in an amount from 10 to 60 wt %, and the third phosphor is present in an amount from 10 to 40 wt %.

6. A green phosphor for a plasma display panel, comprising:
   a first phosphor comprising $ReBO_3$:Tb where Re is a rare earth element selected from the group consisting of Sc, Y, La, Ce, Gd and combinations thereof;
   a second phosphor comprising $MgAl_xO_y$:Mn where x is from 1 to 20 and y is from 1 to 30; and
   a third phosphor selected from the group consisting of $Zn_2SiO_4$:Mn, (Ba, Sr, Mg)O.$\alpha Al_2O_3$:Mn where $\alpha$ is an integer from 1 to 23, and mixtures thereof.

7. The green phosphor according to claim 6, wherein the first phosphor is present in an amount from 30 to 80 wt %, the second phosphor is present in an amount from 10 to 60 wt %, and the third phosphor is present in an amount from 10 to 40 wt %.

8. The green phosphor according to claim 6, wherein the second phosphor is $MgAl_2O_4$:Mn.

9. A plasma display panel comprising a phosphor layer which comprises a red phosphor pattern, a green phosphor pattern, and a blue phosphor pattern, the green phosphor pattern comprising:
   a first phosphor comprising $ReBO_3$:Tb where Re is a rare earth element selected from the group consisting of Sc, Y, La, Ce, Gd and combinations thereof; and
   a second phosphor comprising $MgAl_xO_y$:Mn where x is from 1 to 20 and y is from 1 to 30.

10. The plasma display panel according to claim 9, wherein the first phosphor is present in an amount from 30 to 80 wt %, and the second phosphor is present in an amount from 20 to 70 wt %.

11. The plasma display panel according to claim 9, wherein the second phosphor is $MgAl_2O_4$:Mn.

12. The plasma display panel according to claim 9 wherein the green phosphor pattern further comprises a third phosphor selected from the group consisting of $Zn_2SiO_4$:Mn, (Ba, Sr, Mg)O.$\alpha Al_2O_3$:Mn where $\alpha$ is an integer from 1 to 23, and mixtures thereof.

13. The plasma display panel according to claim 12, wherein the first phosphor is present in an amount from 30 to 80 wt %, the second phosphor is present in an amount from 10 to 60 wt %, and the third phosphor is present in an amount from 10 to 40 wt %.

14. A plasma display panel comprising a phosphor layer which comprises a red phosphor pattern, a green phosphor pattern, and blue phosphor pattern, the green phosphor pattern comprising:
   a first phosphor comprising $ReBO_3$:Tb where Re is a rare earth element selected from the group consisting of Sc, Y, La, Ce, Gd and combinations thereof;
   a second phosphor comprising $MgAl_xO_y$:Mn where x is from 1 to 20 and y is from 1 to 30; and
   a third phosphor selected from the group consisting of $Zn_2SiO_4$:Mn, (Ba, Sr, Mg)O.$\alpha Al_2O_3$:Mn where $\alpha$ is an integer from 1 to 23, and mixtures thereof.

15. The plasma display panel according to claim 14, wherein the first phosphor is present in an amount from 30 to 80 wt %, the second phosphor is present in an amount from 10 to 60 wt %, and the third phosphor is present in an amount from 10 to 40 wt %.

16. The plasma display panel according to claim 14, wherein the second phosphor is $MgAl_2O_4$:Mn.

* * * * *

UNITED STATES PATENT AND TRADEMARK OFFICE
CERTIFICATE OF CORRECTION

PATENT NO. : 7,170,222 B2
APPLICATION NO. : 10/997467
DATED : January 30, 2007
INVENTOR(S) : Choi et al.

It is certified that error appears in the above-identified patent and that said Letters Patent is hereby corrected as shown below:

In the Specification

Column 1, line 62          Delete " O. αAl$_2$O$_3$:Mn",
                           Insert -- O · αAl$_2$O$_3$:Mn--

Column 3, line 23          Delete " O. αAl$_2$O$_3$:Mn",
                           Insert -- O · αAl$_2$O$_3$:Mn--

Column 3, line 44          Delete " O. αAl$_2$O$_3$:",
                           Insert -- O · αAl$_2$O$_3$:--

Column 4, line 19          Delete " O. αAl$_2$O$_3$:Mn",
                           Insert -- O · αAl$_2$O$_3$:Mn--

In the Claims

Column 7, line 28, Claim 4     Delete " O.αAl$_2$O$_3$:Mn",
                               Insert -- O · αAl$_2$O$_3$:Mn--

Column 7, line 43, Claim 6     Delete " O.αAl$_2$O$_3$:Mn",
                               Insert -- O · αAl$_2$O$_3$:Mn--

Column 8, line 21, Claim 12    Delete " O.αAl$_2$O$_3$:Mn",
                               Insert -- O · αAl$_2$O$_3$:Mn--

UNITED STATES PATENT AND TRADEMARK OFFICE
CERTIFICATE OF CORRECTION

PATENT NO. : 7,170,222 B2
APPLICATION NO. : 10/997467
DATED : January 30, 2007
INVENTOR(S) : Choi et al.

It is certified that error appears in the above-identified patent and that said Letters Patent is hereby corrected as shown below:

Column 8, line 38, Claim 14   Delete " $O.\alpha Al_2O_3:Mn$ ",
Insert -- $O \cdot \alpha Al_2O_3:Mn$ --

Signed and Sealed this

Ninth Day of October, 2007

JON W. DUDAS
*Director of the United States Patent and Trademark Office*